(12) United States Patent
Hack et al.

(10) Patent No.: US 7,050,835 B2
(45) Date of Patent: May 23, 2006

(54) INTELLIGENT MULTI-MEDIA DISPLAY COMMUNICATION SYSTEM

(75) Inventors: Michael Hack, Pennington, NJ (US); Scott Seligsohn, Bala Cynwyd, PA (US); Sherwin I. Seligsohn, Penn Valley, PA (US)

(73) Assignee: Universal Display Corporation, Ewing, NJ (US)

( * ) Notice: Subject to any disclaimer, the term of this patent is extended or adjusted under 35 U.S.C. 154(b) by 417 days.

(21) Appl. No.: 10/020,336

(22) Filed: Dec. 12, 2001

(65) Prior Publication Data

US 2003/0109286 A1   Jun. 12, 2003

(51) Int. Cl.
*H04B 1/38* (2006.01)
(52) U.S. Cl. ...................................... 455/566; 379/447
(58) Field of Classification Search ................ 455/566, 455/569.1, 556.1, 575.1, 575.8, 90, 574, 455/550, 556, 575; 345/173, 107, 87, 88, 345/89, 92, 204, 205, 206, 55, 102, 104, 345/27, 36, 37–50, 82, 83, 184; 361/681; 359/107; 358/448; 379/433.12, 445, 447, 379/433.13
See application file for complete search history.

(56) References Cited

U.S. PATENT DOCUMENTS

| | | | |
|---|---|---|---|
| 4,539,507 A | 9/1985 | VanSlyke et al. | 313/504 |
| 4,769,292 A | 9/1988 | Tang et al. | 428/690 |
| 5,294,870 A | 3/1994 | Tang et al. | 313/504 |
| 5,452,092 A * | 9/1995 | Kang et al. | 358/426.02 |
| 5,548,084 A | 8/1996 | Tracy | 174/35 R |
| 5,589,835 A * | 12/1996 | Gildea et al. | 342/357.03 |
| 5,703,436 A | 12/1997 | Forrest et al. | 313/506 |
| 5,707,745 A | 1/1998 | Forrest et al. | 428/432 |
| 5,719,936 A * | 2/1998 | Hillenmayer | 379/447 |
| 5,771,562 A | 6/1998 | Harvey, III et al. | 29/592.1 |
| 5,797,091 A | 8/1998 | Clise et al. | 455/404 |
| 5,799,249 A | 8/1998 | Kennedy, III et al. | 455/411 |
| 5,844,363 A | 12/1998 | Gu et al. | 313/506 |
| 5,867,795 A | 2/1999 | Novis et al. | 455/566 |
| 5,877,695 A | 3/1999 | Kubes et al. | 340/815.4 |
| 5,895,731 A | 4/1999 | Clingempeel | 429/162 |
| 5,931,764 A | 8/1999 | Freeman et al. | 482/4 |
| 5,965,907 A | 10/1999 | Huang et al. | |
| 6,002,927 A | 12/1999 | Hayes, Jr. | 455/351 |
| 6,073,034 A | 6/2000 | Jacobsen et al. | 455/566 |
| 6,107,980 A * | 8/2000 | Hermanns et al. | 345/90 |

(Continued)

FOREIGN PATENT DOCUMENTS

DE         198 22 024        11/1999

(Continued)

OTHER PUBLICATIONS

Copy of the PCT Written Opinion dated Sep. 25, 2003 (PCT/US02/39197).

(Continued)

*Primary Examiner*—Nay Maung
*Assistant Examiner*—Tu X. Nguyen
(74) *Attorney, Agent, or Firm*—Kenyon & Kenyon

(57) ABSTRACT

Interactive, low power, collapsible, intelligent, multi-media display systems for use as hand-held, portable communications devices are disclosed. A display communications device according to the invention can include a housing that contains a processor, radio transceiver means for transmitting and receiving radio signals, and a collapsible display that is mechanically coupled to the housing and electrically coupled to the processor. The display can have a surface area that is larger than any cross-sectional area of the housing. The processor can be adapted to extract display data from input radio signals, and to provide a representation of the display data to the display.

51 Claims, 7 Drawing Sheets

U.S. PATENT DOCUMENTS

| | | | |
|---|---|---|---|
| 6,130,603 | A | 10/2000 | Briechle ................. 340/10.34 |
| 6,178,338 | B1 | 1/2001 | Yamagishi et al. |
| 6,195,548 | B1* | 2/2001 | Schultheiss ................. 455/419 |
| 6,239,812 | B1* | 5/2001 | Pettazzi et al. ............. 345/648 |
| 6,269,169 | B1 | 7/2001 | Funk et al. ................. 382/100 |
| 6,278,377 | B1 | 8/2001 | DeLine et al. ........... 340/815.4 |
| 6,303,238 | B1 | 10/2001 | Thompson et al. ......... 428/690 |
| 6,304,763 | B1 | 10/2001 | Jahagirdar et al. .......... 455/566 |
| 6,311,076 | B1* | 10/2001 | Peuhu et al. ................. 455/566 |
| 6,384,804 | B1* | 5/2002 | Dodabalapur et al. ........ 345/82 |
| 6,434,403 | B1 | 8/2002 | Ausems et al. ............. 455/556 |
| 6,445,489 | B1* | 9/2002 | Jacobson et al. ........... 359/296 |
| 6,458,475 | B1 | 10/2002 | Adachi et al. |
| 6,459,418 | B1* | 10/2002 | Comiskey et al. .......... 345/107 |
| 6,483,719 | B1 | 11/2002 | Bachman |
| 6,574,209 | B1 | 6/2003 | Kosaka |
| 6,603,259 | B1 | 8/2003 | Kiryuschev et al. |
| 6,628,447 | B1* | 9/2003 | Want et al. ................. 359/211 |
| 6,640,113 | B1* | 10/2003 | Shim et al. ................. 455/566 |
| 6,643,124 | B1* | 11/2003 | Wilk .......................... 361/681 |
| 6,663,957 | B1 | 12/2003 | Takushima et al. |
| 6,677,894 | B1 | 1/2004 | Sheynblat et al. |
| 6,771,776 | B1 | 8/2004 | Rose |
| 6,778,180 | B1* | 8/2004 | Howard et al. ............. 345/581 |
| 6,895,514 | B1 | 5/2005 | Kermani |
| 2001/0003450 | A1 | 6/2001 | Hemia et al. |
| 2001/0017604 | A1* | 8/2001 | Jacobsen et al. ............... 345/27 |
| 2001/0024946 | A1 | 9/2001 | Uhlemann |
| 2002/0037756 | A1 | 3/2002 | Jacobs et al. |
| 2002/0050958 | A1* | 5/2002 | Matthies et al. ............... 345/55 |
| 2002/0055938 | A1* | 5/2002 | Matsuo et al. ........... 707/104.1 |
| 2002/0058103 | A1 | 5/2002 | Gu et al. |
| 2002/0068619 | A1* | 6/2002 | Nagai .......................... 455/575 |
| 2002/0090980 | A1* | 7/2002 | Wilcox et al. .............. 455/566 |
| 2002/0113921 | A1 | 8/2002 | Jiang et al. |
| 2002/0176992 | A1* | 11/2002 | Parthasarathy et al. .. 428/411.1 |
| 2003/0050019 | A1* | 3/2003 | Dowling et al. ............... 455/90 |
| 2003/0078082 | A1* | 4/2003 | Su .............................. 455/572 |
| 2003/0098857 | A1* | 5/2003 | Gettemy et al. ............ 345/173 |
| 2003/0117382 | A1* | 6/2003 | Pawlowski et al. ......... 345/204 |

FOREIGN PATENT DOCUMENTS

| | | |
|---|---|---|
| EP | 0 424 074 | 4/1991 |
| EP | 0 969 644 | 1/2000 |
| GB | 2 312 999 | 11/1997 |
| JP | 2-15858 | 1/1990 |
| JP | 11-272205 | 10/1999 |
| JP | 2000-132122 | 5/2000 |
| WO | WO 00/49731 | 8/2000 |
| WO | WO 00/54479 | 9/2000 |
| WO | WO 01/50232 | 7/2001 |

OTHER PUBLICATIONS

*GigaNixel Display Program*, "A New Display System Architecture . . . Enabled by Intelligent Nano-Pixels"(Nixels), Received Jan. 19, 2001.

"Active reading machine information appliance," http://www.csdl.tamu.edu, Dec. 17, 2002, 5 pages.

Bullock, G., "National semiconductor introduces geode origami portable mobile communicator, industry's first device to combine eight consumer electronics products in one flexible unit," *National Semiconductor*, http://www.national.com, Dec. 17, 2002, 3 pages.

CPSC610 Homework 1, "Homework 1: MEMEX project," http://www.csdl.tamu.edu, Dec. 17, 2002, 10 pages.

Digital Libraries, "Center for the study of digital libraries home page," *Hewlett Packard*, http://www.csdl.tamu.ed, Dec. 17, 2002, 1 page.

Francisco-Revilla, L., "Personal research academic Texas A&M," http://www.csdl.tamu.edu, Dec. 17, 2002, 1 page.

Poe, W., "The future of computing technology is taking shape," *St. Louise Commerce Magazine*, May 2001, 5 pages.

Siemens R&I, "Dawn of the plastic displays," *Siemens*, http://w4.siemens.de, Dec. 17, 2002, 5 pages.

Siemens Webzine PoF 1_02, "The 'always-on' generation," *Siemens*, http://w4.siemens.de, Dec. 17, 2002, 4 pages.

Siemens Webzine PoF/UMTS, "Multimedia in motion: UMTS on the isle of man," *Siemens*, http://w4.siemens.de, Dec. 17, 2002, 3 pages.

SpyFiArchives & Biederman, D., "U.N.C.L.E. cigarette case communicator," http://www.cia.gov, 1964, 1 page.

P. Drazic et al., "44.3L: A Printed and Rollable Bistable Electronic Display", SID Digest, 1998.

D. Clark, ". . . Display Screens," 1 page.

Welcome to 2010, "The Tube," *Business Week*, http://www.businessweek.com, Feb. 27, 2000, 1 page.

NAIS Matsushita Electric Works, "New "Mobile Internet" market being created in Japan", www.nikkeibp.asiabiztech.com, Apr. 24, 2000, 1-5.

Handspring, Inc., "Reports of FCC approval send stock price up 38%", 1 page.

"Say Goodbye to the 'Ol Ball and Chain", *The Wall Street Journal*, Jun. 27, 2001, 2 pages.

"World's first 3G service from May 2001", *NTT DoCoMo, Inc.*, www.nttdocomo.com, 2 pages.

"Vision and action at NTT DoCoMo, Growing in Japan and reaching overseas", *Barrons*, www.nttdocomo.com, Aug. 23, 1999, 3 pages.

"It's a Phone with a Brain", *The Wall Street Journal*, Mar. 13, 2001, 2 pages.

"Pager Maker Gets Patent for E-Mail Delivery", *Wall Street Journal Staff Reporter*, 1 page.

Clark, D. "Display Screens, Screens will continue to get flatter and brighter. And then, one day, maybe not so flat", *The Wall Street Journal's San Francisco Bureau*, 1 page.

Fountain, H. "Why Time Stands Still", *Observatory*, 1 page.

Gerard, A. "Visual Communication-The Next Megatrend", *Future Image*, 1 page.

Guidera, J. "NCR is Suing Palm, Handspring over Alleged Patent Infringement" *The Wall Street Journal*, 1 page.

Henning, T. "Imaging without wires", *Future Image*, 1 page.

Kanaley, R. "Both attendance and introduction of products were down at the annual Comdex gathering", *The Philadelphia Inquirer*, Nov. 22, 2001, 2 pages.

LaOedus, M. "Wireless world takes on data", "Chip suppliers, OEMs expect new generation of devices, platforms", *Electronic Buyers' News*, 2000, 2 pages.

Mannion, P. "Antenna signals a leap for software radio", *Electronic Engineering Times*, 2001, 3 pages.

Mossberg, W.S. "New samsung hybrid is first a palm device, then a mobile phone", *Personal Technology*, 1 page.

Pilgrim, B. "Is that your video game ringing?", *Machine Design*, 2001, 67-73.

Pringle, D. "Cultures clash over next mobile phone", 2001, *The Wall Street Journal*, 1 page.

Tam, P.W. "Cellphone or Computer? New ads by Samsung set to explain it all", 2001, *The Wall Street Journal*, 1 page.

Tam, P.W. "From chips to neurons: Palm's inventor sets his sights on the brain", *The Wall Street Journal*, 2 pages.

Tam, P.W. "Wireless telephones shed keypads to make way for bigger screens", *The Wall Street Journal*, 2 pages.

Wingfield, N. "AOL expands links to wireless to wireless services", *The Wall Street Journal*, 1 page.

Copy of PCT International Search Report dated Mar. 19, 2003 (PCT/US02/39197).

SpyFiArchives & Biederman, D., "U.N.C.L.E. cigarette case communicator," http://www.cia.gov, 1965, 1 page.

SpyFiArchives & Biederman, D., "U.N.C.L.E. pen communicator," http://www.cia.gov, Dec. 17, 2002, 1 page.

U.S. Appl. No. 10/219,760, filed Aug. 16, 2002, Forrest et al.

* cited by examiner

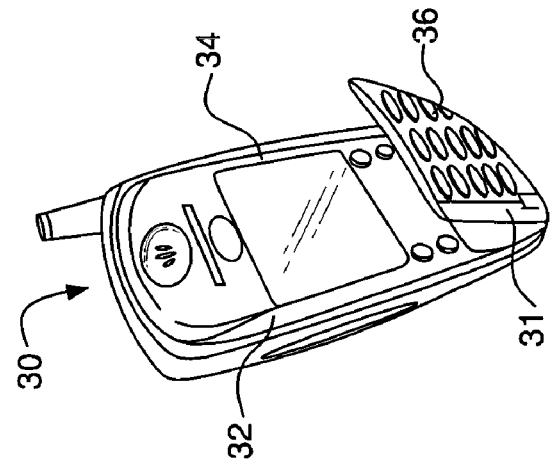
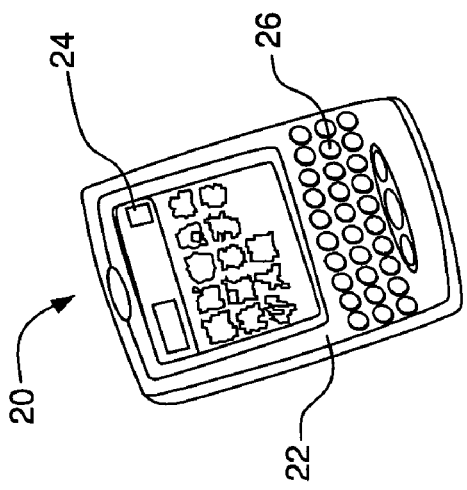
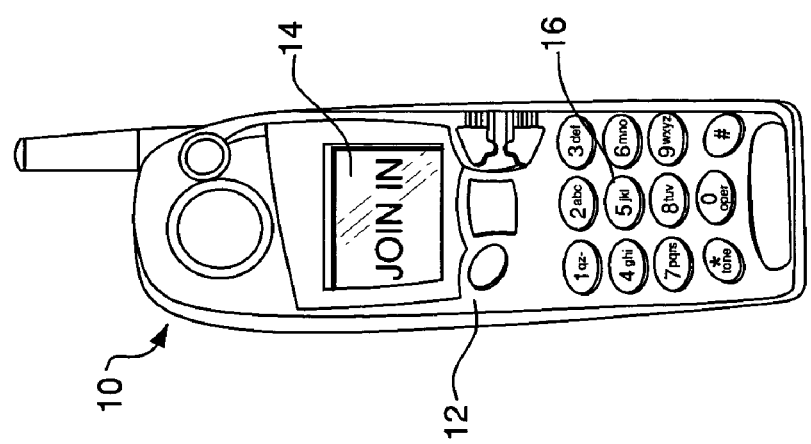
FIG. 1C
FIG. 1B
FIG. 1A

US 7,050,835 B2

INTELLIGENT MULTI-MEDIA DISPLAY COMMUNICATION SYSTEM

CROSS-REFERENCE TO RELATED APPLICATIONS

This application is related to co-pending U.S. patent application Ser. No. 10/313,678, filed Dec. 6, 2002.

FIELD OF THE INVENTION

This invention relates to display systems. More particularly, the invention relates to interactive, low power, collapsible, intelligent, multi-media display systems for use as hand-held, portable communications devices.

BACKGROUND OF THE INVENTION

As the demand increase for hand-held, portable communications devices such as telephones, personal digital assistants (PDAs), and the like, so does the demand that such devices provide increased capabilities. For example, consumers are demanding hand-held devices that include telephone capability, paging, fax, wireless internet access, data storage, and so forth. At the same time, however, consumers are demanding that manufacturers continue to decrease the size of such devices.

Such hand-held devices typically include displays. A problem manifested by the decreased size of these devices is that the displays are often too small to provide much information, and the information that can be provided is usually not provided in a visually appealing manner. For example, a typical light emitting diode (LED) display or liquid crystal display (LCD) on a small, hand-held telephone or PDA can be unclear and might not be able to display an adequate amount of information. For example, such a display typically cannot display an entire Web page. Additionally, such displays are typically not full-color displays.

Typical prior art hand held communications devices include a housing that contains the processing electronics for the device. The housing is the part of the device that the user holds in his hand and, accordingly, is typically designed to fit comfortably into a human hand. The display is typically integrated into the housing. Consequently, the size of the display is limited by the size of the housing. Additionally, the manufacturer's ability to decrease the size of the device is impeded because such displays typically require a relatively large amount of electrical energy and, therefore, that the housing contain a relatively large power supply.

FIGS. 1A–1C depict several typical prior art hand held communications devices. FIG. 1A depicts a hand held telephone 10 having a housing 12 and a display 14 that is integrated into the housing 12. As shown, the display 14 is smaller than the housing 12. The telephone 10 includes a keypad 16 that includes a plurality of buttons that the user can use to operate the device. The keypad 16 is separate from the display 14.

Similarly, FIG. 1B depicts a personal digital assistant 20 having a housing 22 and a display 24 that is integrated into the housing 22. Again, the display 24 is smaller than the housing 22. The PDA 20 includes a keyboard 26 that the user can use to operate the device 20. The keyboard 26 is separate from the display 24.

FIG. 1C depicts a so-called flip phone 30 having a housing 32 and a display 34 that is integrated into the housing 32. As shown, the display 34 is smaller than the housing 32. When the flip cover 31 is closed, it covers a portion of the display 34. The flip cover 31 can be opened to reveal the covered portion of the display 34. Alternatively, the display 34 could be integrated into the flip cover 31 of the phone 30. As the flip cover 31 has a surface area that is no bigger than the surface area of the housing 32, the display 34 is smaller than the housing 32 in any event. The flip phone 30 includes a keypad 36, which is separate from the display 34.

In each case, the display is merely one of several elements that is integrated into (or otherwise coupled to) the housing of the device. In each case, the display is small, rigid, fixed in size, and generally rectangular in shape. Consequently, the displays are of limited utility in providing meaningful information to the user. Thus, there is a need in the art for intelligent multi-media display communications systems.

SUMMARY OF THE INVENTION

These needs in the art are satisfied by an interactive, low power, collapsible, intelligent, multi-media display system according to the invention. Such display systems can be used as hand-held, portable communications devices. A display communications device according to the invention is an interactive, bi-directional communications device that can include a housing that contains a processor; radio transceiver means, coupled to the processor, for transmitting and receiving radio signals; and a collapsible display that is mechanically coupled to the housing and electrically coupled to the processor. The display can have a surface area that is larger than any cross-sectional area of the housing. The processor can be adapted to extract display data from the input radio signals, and to provide a representation of the display data to the display. The housing can contain a low voltage power supply, such as a thin film power supply.

The processor can be further adapted to receive commands from the display and to form the output radio signals based on the received commands. The display can be adapted to process touch commands, and the received commands can be based on the touch commands. A speaker can be coupled to the processor for transmitting output audio signals, and the processor can be adapted to extract audio data from the input radio signals, and to provide to the speaker output audio signals that are representative of the extracted audio data. A microphone can be coupled to the processor for receiving input audio signals, and the processor can be adapted to form output radio signals based on the input audio signals. The processor can be adapted to form the output radio signals by modulating a carrier signal with a representation of the input audio signal.

The device can be voice activated. The processor can be adapted to determine whether the input audio signals are telephone signals or commands. The processor can initiate a connection between the display communications device and a remote network device, such as by a connection to the internet. The processor is adapted to determine whether the device is in a telephone mode or a command mode. If the device is in command mode, the processor is adapted to respond to voice activation commands. The display can be a flexible display. The communications device can include a rod that is rotationally coupled to the housing and fixedly coupled to a first end of the display such that the display can be wound around the rod. The rod can be coupled to the interior or the exterior of the housing. The device can include a locking mechanism for holding the display in an extended position. The display can be a foldable display. A first end of the display can be coupled to the housing such that the display can be folded into or onto the housing.

The display can be touch responsive. The display can provide touch signals to the processor and the processor perform responsive operations in response to receiving the touch signals. The display communications device can also include display memory for storing display data that corresponds to information currently being displayed. The display memory can be embedded into the display (e.g., in the pixels themselves), or contained in the housing.

The display can include a plurality of bistable pixels. For example, the display can include a plurality of organic light emitting devices (OLEDs). The OLEDs can be ordinary, side-by-side OLEDs, stacked OLEDs (SOLEDs), or transparent OLEDs (TOLEDs), for example. Additionally, the OLEDs can be integrated with organic photodetectors.

The display can include a plurality of self-configurable pixels. Each pixel can include a local processor and a memory that contains a pixel address associated with the pixel. The pixels can be adapted to configure themselves with respect to grayscale and resolution. The pixels can include groups of sub-pixels, where each sub-pixel includes a number of light emitting devices. The number of light emitting devices that form a sub-pixel can depend on grayscale and resolution of the pixel.

The processor can update the display by providing a data packet that includes a pixel address and a brightness that corresponds to a pixel located at the pixel address. The processor can be adapted to compare a current image with a previous image, and to identify one or more pixels having a pixel brightness that needs to be changed to convert the display from the previous image to the current image. The processor can provide the display with display data that causes the pixel brightness of the one or more identified pixels to change.

The display can be removably coupled to the housing, and adapted to be removably coupled to each of a plurality of external devices. The display can be adapted to automatically configure to the external device to which it is coupled.

BRIEF DESCRIPTION OF THE SEVERAL VIEWS OF THE DRAWING

Other features of the invention are further apparent from the following detailed description of the embodiments of the present invention taken in conjunction with the accompanying drawing.

FIGS. 1A–1C depict typical prior art hand-held communications devices having relatively small displays that are integrated into their respective housings.

DETAILED DESCRIPTION OF THE INVENTION

Figure 2:
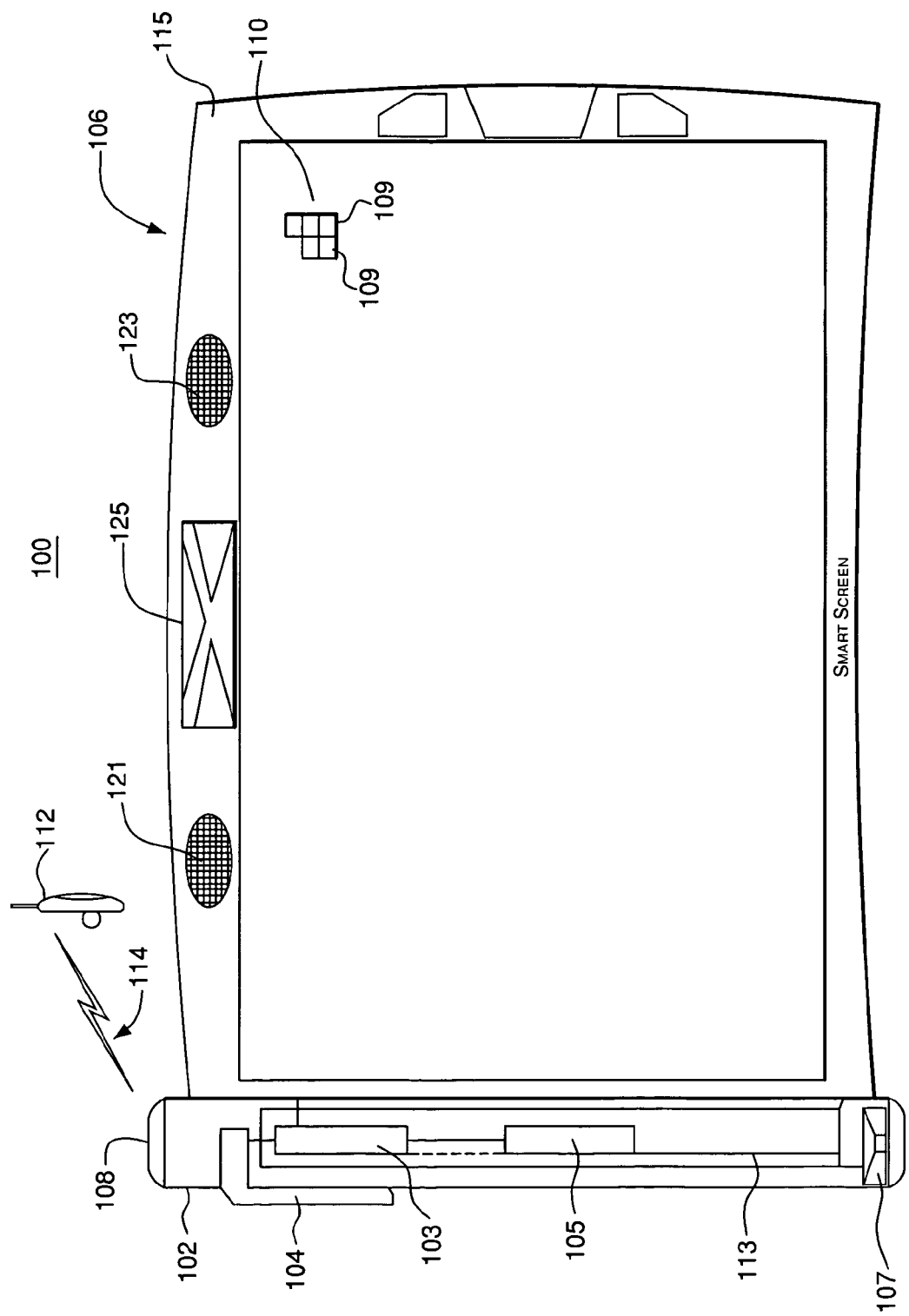
FIG. 2 depicts a preferred embodiment of an intelligent multi-media display communications system according to the invention.

FIG. 2 depicts a preferred embodiment of an intelligent multi-media display communications device 100 according to the invention. As shown, the device 100 includes a housing 102 that contains a processor 103, which includes the primary processing electronics for operating the device 100. Preferably, the device 100 is a hand-held or pocket-sized device that has an overall shape similar to that of a pen or pointer, for example, as shown. In such an embodiment, the housing 102 is an elongated, narrow housing. The housing 102 can be made of plastic, for example.

The processor 103 can include, but is not limited to, a microprocessor. Preferably, the processor 103 is a thin film "digital radio on a chip." That is, the processor 103 provides the capability for processing of analog and digital radio signals. The processor can provide compound radio capabilities (i.e., multiple radio on a chip). For example, the device 100 can be adapted to transmit, process, and receive short range, infrared signals, or short, intermediate, or long range radio-frequency (RF) signals, depending on the particular characteristics of the environment, the application, and the external device with which the display communications device 100 is communicating.

Preferably, the processor 103 includes control means for selectively and/or simultaneously controlling the transmission and receipt of communications signals that contain audio, video, and/or control data. Additionally, the processor 103 preferably includes control means for selectively and/or simultaneously controlling the display or storage of audio, video, and/or control data that the device receives. A detailed description of the functions that the processor 103 can perform in a preferred embodiment of the invention is provided below.

The device 100 includes means 104, such as an antenna, for example, for transmitting output radio signals and receiving input radio signals. The radio signals can be analog or digital radio signals. The device 100 can operate in one or more of simplex, half duplex, and full duplex transmission modes. The device 100 can accommodate access schemes such as time division multiple access (TDMA), frequency division multiple access (FDMA), code division multiple access (CDMA), narrowband CDMA (NCDMA), and broadband (or wideband) CDMA (BCDMA), for example, or any combination of such access schemes. The radio transceiver means 104 can be adapted to transmit and receive communications signals via any electromagnetic carrier, such as radio-frequency (RF), infrared, ultraviolet, or the like, or optically.

The device can communicate with (transmits signals to or receive signals from) a single base station, a plurality of base stations (i.e., a network), or any number of external devices. Thus, a communications device 100 according to the invention can be a node on a telecommunications network, such as a cellular network, for example. The device 100 can transmit communications signals to, and receive communications signals from, one or more base stations in the network. Similarly, the base stations can transmit communications signals to, and receive communications signals from, the device 100. As the device moves from the proximity of a first base station into the proximity of a second base station, the first base station can automatically handoff the current communications link with the device (inbound or outbound communications; voice or data) to the second base station. Thus, the device 100 can remain in communication with the base stations (and, consequently, with the far-end device to which it is communicating) as the user moves.

The antenna 104 is electrically coupled to the processor 103. Preferably, the antenna 104 is externally coupled to the housing 102. For example, the antenna 104 can be embedded into the housing 102 or affixed to an exterior of the housing 102.

Preferably, the antenna 104 is adapted to transmit and receive broadband, audio/video signals for internet access and telephony. That is, the antenna is capable of transmitting and receiving full duplex data and voice, and provides broadband internet access. Preferably, the device 100 provides high speed, mobile access to the internet.

In a preferred embodiment, the radio transceiver means 104 is capable of transmitting and receiving broadband signals. Such broadband signals can be compatible with third-generation (3G) or fourth-generation (4G) digital radio standards, for example. Final standards for 3G broadband mobile wireless data transmissions via smart phones have been formally adopted by the ITU Radiocommunication Assembly by approval of the so-called IMT-2000 specification. Preferably, the radio transceiver means 104 is adapted to transmit and receive radio signals having bandwidths of about 5 to 30 MHz, though it is anticipated that greater bandwidths might be used in future communications applications. Additionally, data rates of up to about 10 Mbps, or more, are anticipated.

The radio transceiver means 104 can include processing (either in the antenna itself or in the processor 103) for providing diversity. That is, the transmitting device can transmit the same signal a number of times (e.g., three), and the receiving device can use the best of the signals that it receives. Additionally, the radio transceiver means 104 can be a smart antenna that includes processing (either in the antenna itself or in the processor 103) to measure, amplify, and otherwise optimize the input and output signals depending on the characteristics of the environment in which the signal is being transmitted or received. The device 100 can also include software defined radio (SDR) capabilities.

The communications device 100 can also include a microphone for receiving input audio signals and one or more speakers for transmitting output audio signals. The speaker can be used to provide, for example, output audio signals that are received as part of a telephone conversation, output audio that is downloaded from the internet as part of a web page, or synthesized human speech produced by the device itself as a form of communication with the user. The speaker can also be used to provide identifiable sounds, such as a ringing sound if a call is incoming, or a tone (or series of tones) to indicate that a certain action has been taken (e.g., the device has successfully connected to (or failed to connect to) an internet service provider).

Preferably, the communications device 100 includes a microtransceiver 108 having both a speaker (audio signal transmitter) and a microphone (audio signal receiver). The microtransceiver 108 is electrically coupled to the processor 103 and can be integrated into the housing 102 or attached externally thereto. The processor 103 is adapted to extract audio data from the input radio signals, and to provide to the speaker output audio signals that are representative of the extracted audio data. The processor 103 is also adapted to form output radio signals based on input audio signals received from the microphone.

The device 100 can also include a wireless inductive transceiver 112 that provides audio to, and receives audio from, the user of the device. The wireless transceiver 112 can be a wireless earpiece, for example, that communicates with the processor via a wireless link 114. Preferably, the transceiver is an inductive transceiver that forms audio signals representing the user's speech based on the transceiver's detection of the vibrations of the speaker's vocal cords, for example. Thus, the processor 103 can convey audio signals to the transceiver 112, and the transceiver 112 can convey audio signals to the processor 103.

The display communications device 100 can include an A/D converter (as part of the processor 103 or external thereto), to which the microphone (or transceiver) is coupled. Analog audio signals from the microphone or transceiver are input to the A/D converter. The digitized output of the A/D converter is provided to the processor 103. The processor 103 then determines whether the device is in telephone mode (in which case the audio should be sent via the radio transceiver means 104), or in command mode (in which case the audio should be interpreted and an action taken in response). Thus, the microphone can be coupled to the processor 103, and used as an audio input means for both telephonic communications and to issue voice commands to the device 100.

Preferably, the processor 103 has the capability to understand and recognize human speech. Speech recognition techniques are fairly well known, and are becoming more and more common as computational power and the amount of available memory continues to increase. The user can speak to the device 100 either to transmit speech to a third party, or to give the device 100 a command. Preferably, a display communications device 100 according to the invention includes established verbal commands or keyboard actions to tell the processor 103 whether it is to transmit the input speech (i.e., that the device is in telephone mode) or to interpret the input speech as a command (i.e., that the device is in command mode).

If the processor 103 determines that the device 100 is in telephone mode, then the digitized audio signal can be compressed and encrypted, if desired, and input to a D/A converter and a modulator where an RF signal is modulated with the audio signal. The modulated RF signal is then passed to the antenna 104 where it is transmitted out of the device 100. If the processor 103 determines that the device 100 is in command mode, then the processor 103 performs speech recognition on the digitized audio input signal using well known speech processing techniques. The processor 103 can also include a command controller for causing an action to be taken in response to receiving a voice command.

Received radio signals can be passed from the antenna 104 through a demodulator, A/D converter, decryptor, and decompressor. Digital audio signals can be extracted from the received radio signals, and provided to the speaker for audio output.

Preferably, the housing 102 also contains a low voltage power supply 107, such as a rechargeable thin film battery. Such batteries are typically less than 10 microns thick, and can have open circuit voltages of about 2–5 V. The batteries can be cycled thousands of times, and can typically be operated at any temperature up to the melting point of lithium (180° C.). U.S. Pat. No. 5,895,731, entitled "Thin-Film Lithium Battery and Process" describes thin film lithium batteries and processes for making them. These batteries can be constructed in either prismatic or cylindrical configuration.

Alternatively, the device 100 can include a power generator, such as a methanol/hydrogen powered micro fuel cell. Such fuel cells typically use hydrogen to react with oxygen and produce an electrical current. Methanol is typically used in such fuel cells as it is known to be a good carrier fuel for the hydrogen that fuel cells need. Methanol-only micro fuel cells are being developed (by Motorola, for example) and it is anticipated that the use of such fuel cells might be advantageous in a display communications device according to the invention.

A solar power supply, such as a solar battery, for example, or any photovoltaic material that can convert sunlight into electricity, can also be used to provide electrical power to the device 100. Such a solar power supply can allow the device to operate on solar power alone. Preferably, a flexible, organic photovoltaic cell can be used.

When the device is operating, additional power generated (by the solar power supply or micro fuel cell, for example) can be used to charge the battery. When the device is off, all power generated can be used to charge the battery.

According to the invention, an intelligent display system 106 can be coupled to the housing 102. The display system 106, which can be electrically coupled to the processor 103, can operate in conventional mode or intelligent mode. In conventional mode, the whole displayed is refreshed periodically (e.g., 60–100 times per second). In such an embodiment, conventional video processing electronics can be used to connect the display system 106 to the processor 103 (or other, external video source). If the display system 106 is operating in an "intelligent mode," then only updated information needs to be supplied to the display. In such an embodiment, the processor 103 can control the display 106 directly. The processor 103 can take the video input, process the information so as to detect changes in the display image from frame to frame, and then send out the appropriate video information to the display system 106.

The processing power for the display system 106 can be provided by the processor 103. In such an embodiment, the processor 103 can be adapted to compare the most recently received image (i.e., the image to be displayed) with the previously received image (i.e., the image that is currently being displayed). The processor 103 can then update individual pixels 109 as necessary.

Alternatively, processing power could be provided locally to each pixel 109. For example, each pixel 109 could be programmed (or initialized) to know where it is relative to other pixels in the display. Unique addressing codes can be provided so that each pixel 109 knows what to display. Thus, the pixels 109 in an intelligent display system 106 can be viewed as nodes on a network. In such an embodiment, the processor 103 can provide display signals to the pixels 109. Preferably, a display signal includes an address that corresponds to a particular pixel (or group of pixels) and content that indicates what the addressed pixel (group) is to display. The pixel receives the signal and determines from the signal what it is to display. It is also contemplated that the processor can provide higher level information to the pixels. In such an embodiment, each pixel 109 can perform calculations on the higher level information to determine what it has to display.

In a conventional display, driver electronics can provide the necessary information to each pixel 109 as to its brightness state. In an intelligent display, the pixels can be interconnected via a common data bus that carries data packets to the pixels. The data packets can include fields that have values that represent pixel location and brightness. The data packet can provide either the physical or logical address of the pixel it is addressing, as well as the brightness state of that pixel. In such an embodiment, each pixel 109 can include circuitry to decode the address and brightness information.

According to one aspect of the invention, the display screen 110 can have a surface area that is larger than any cross-sectional area of the housing 102. Though the display screen can have a generally rectangular overall shape as shown, it should be understood that, in general, a display system 106 according to the invention has an unconstrained form factor. That is, the substrate onto which an intelligent display is formed can take on any shape.

Preferably, the display 106 is a high efficiency, interactive, multi-media display system. The display 106 should emit as much brightness as possible, with as little power consumption as possible. In a preferred embodiment of the invention, the display screen 110 comprises a plurality of pixels 109. Each pixel 109 comprises one or more light emitting elements. The pixels 109 can include organic materials, inorganic materials, or a combination of organic and inorganic materials. Preferably, the light emitting elements are high efficiency, organic light emitting devices (OLEDs) that use phosphorescent emitters such as disclosed in U.S. Pat. No. 6,303,238 B1, which is hereby incorporated herein by reference in its entirety. Fluorescent emitters, such as those disclosed in U.S. Pat. Nos. 4,539,507, 4,769,292, and 5,294,870 can also be used. The organic layers of the OLEDs can include small molecular (i.e., non-polymeric, unlinked) materials or large molecular (i.e., polymeric, linked) materials. The OLEDs can be ordinary, side by side OLEDs, transparent OLEDS (TOLEDs), or stacked (i.e., multiple resolution) OLEDs (SOLEDs). Examples of TOLEDs are described in U.S. Pat. No. 5,703,436, the contents of which are hereby incorporated herein by reference. Examples of SOLEDs are described in U.S. Pat. No. 5,707,745, the contents of which are hereby incorporated herein by reference.

Figure 3:
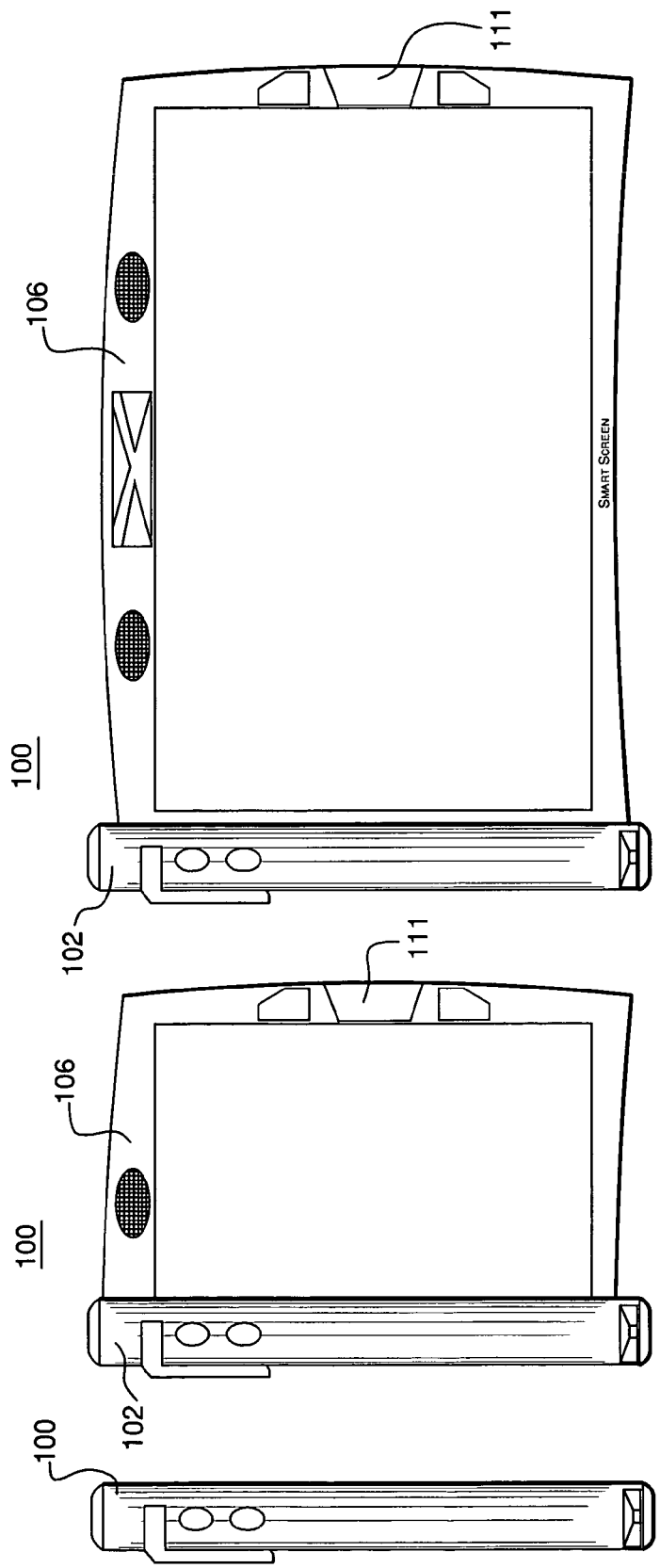
FIGS. 3A–3C depict a preferred embodiment of a display communications system according to the invention having a collapsible display.

As depicted in FIGS. 3A–3C, the display 106 can be collapsible. That is, the display 106 can be formed on a collapsible substrate, and coupled to the housing 102 in such a manner that the display 106 can be pushed or pulled onto or into the housing 102. FIG. 3A shows the display 106 fully collapsed; FIG. 3B shows the display 106 partially extended; FIG. 3C shows the display 106 fully extended. It is contemplated that the display substrate can be formed from a smart material that is flexible when the display 106 is retracted, but becomes rigid when the display 106 is extended.

Thin film deposition processes can be used for depositing the pixels onto a collapsible substrate to form a collapsible display. Preferably, the display 106 is fabricated on a flexible substrate, such as plastic or thin metal foil.

Active-matrix backplanes that are compatible with plastic substrates can be fabricated, and deposited into the flexible substrate. The pixels can then be deposited thereon. Though active-matrix displays are preferred, it should be understood that passive-matrix displays can also be used in accordance with the principles of the invention. Active-matrix displays typically use transistors to keep their diodes in an on or off state. Passive-matrix displays, on the other hand, apply current to the diodes at a specific refresh rate to maintain an image.

OLED display technology is preferred for use on such flexible substrates because of, among other reasons, its very low substrate temperature during deposition, as well as its high brightness at low power levels. Small molecule OLEDs can be used, such as described in U.S. Pat. No. 5,844,363, for example. Encapsulation to prevent moisture and oxygen from permeating through the plastic films and degrading the OLED performance is also preferably provided, for example, such as disclosed on U.S. Pat. No. 5,771,562.

Flexible liquid crystal or field emission displays can also be used. For example, a flexible OLED backlight can be used to illuminate a flexible LCD to provide a flexible backlit LCD. Additionally, a flexible display medium, such as "Electronic ink," for example, that is processed into a film for integration into electronic displays can also be used. ("Electronic ink" is proprietary to E Ink Corporation.)

The display 106 can be formed as a flexible display that can be rolled around a rod 113 (see FIG. 2), for example. One or both ends of the rod 113 can be rotationally coupled to ends of the housing 102. The rod 113 can be mounted inside the housing 102 or on the exterior thereof. To collapse such a display, the user simply causes the display 106 to wind around the rod 113. Alternatively, the display 106 can be formed such that it can be folded like a map and attached to either the interior or exterior of the housing 102.

Preferably, the display 106 is fabricated from materials that provide a display having as small a radius of curvature as possible. That is, the display 106 should be flexible enough to roll or fold into a housing 102 that is about the size of an ordinary pen or pointer, as discussed above. For example, the substrate should be thin enough so that the display, while retracted into the housing, for example, has as small a cross-sectional area as possible (transverse to the long direction of the rod). Similarly, the components that are deposited onto the substrate should be small enough and flexible enough to provide for a sufficiently small radius of curvature. OLED technology is preferred because of the very small pixel size that can be attained (such as the so-called "nanopixels," for example).

Preferably, the display 106 is auto-collapsible (much like a tape measure). That is, like a tape measure, tension is placed on the rod 113 so that the display 106 will be wound around the rod 113 automatically unless the display 106 is locked into an extended position. The display 106 can also include an auto lock feature so that when the display 106 is fully extended, the locking mechanism is automatically latched. While the display 106 is locked, the user can cause the display 106 to wind around the rod 113 by unlatching the locking mechanism. For example, the locking mechanism can be a latch that can be set at any point, or which is automatically set when the display 106 is fully extended, or at any of a number of points while the display 106 is being extended. The display 106 can include an auto-collapse button 111 that, when pressed, causes the display 106 to collapse. For example, in an embodiment wherein the display 106 winds around a rod 113, the auto-collapse button 111 can cause the rod 113 to rotate and the display 106 to be wound around the rod 113. The device 100 can also include a motor (not shown) that causes the display 106 to spool onto or off of the rod 113 (i.e., into or out of the housing 102). Preferably, the motor is sized and shaped such that it can be contained within the housing 102.

The processor 103 is adapted to extract display data from the input radio signals, and to provide a representation of the display data to the display 106. In a preferred embodiment of the invention, the protocol for communications between the communications device 100 and external devices provides for a significant reduction in the required communications bandwidth relative to current communications protocols. For example, in a system according to the invention, information for every pixel 109 need not be transmitted continuously. Rather, each pixel 109 can be provided with enough "intelligence" to determine what it is expected to display based on higher level information that is provided via the communications from the outside world. Additionally, the display 106 can be updated by changing only those pixels 109 that need to be changed as the image changes. For backward compatibility, however, the device 100 preferably includes the capability to operate using existing protocols (i.e., to translate from the old protocol to the new).

The display communications device 100 can also include a memory 105, which can be contained in the housing 102 or embedded into the display 106. Alternatively or additionally, the device 100 can include a removable memory, such as a memory card, and a miniature drive for reading from and writing data to the memory card. The memory can be used for temporary or permanent storage of audio, video, or other data that the communications device 100 receives, transmits, or uses during its operation.

Such a memory can also reduce the bandwidth requirement between the display system 106 and an external device by storing information about the current display. As a result, the processor 103 can pass only information that updates the display 106. In a preferred embodiment of an intelligent display, the display system 106 can include individual memory in each pixel 109. Basic memory cells, such as a few transistors, could be used to provide the required memory. The use of a few transistors at each pixel 109 reduces or eliminates the need to keep moving information from the outside to the pixel. Alternatively, an external chip could be used to make it easy for pixel memories to talk to one another.

The memory could be implemented as a large area electronic backplane, such as an active matrix display. For example, a pixel matrix could be overlaid on a backplane such that a number of transistors would be associated with each pixel. Currently, the display backplane is built first, and then the light emitting elements are deposited onto it. Typically, the display backplane includes electronics. In an intelligent display system according to the invention, additional electronics could be added for pixel-specific memory. Preferably, amorphous silicon, polysilicon, organic thin film technologies (TFTs), or other TFTs are used.

In an intelligent display according to the invention, the pixels 109 can include TFTs, or other electrical components, which can be connected to provide memory. The TFTs can be used to form conventional memory elements, which store data such as the associated pixel's location or brightness. If the information being displayed on the display 106 is such that any specific pixel's brightness state does not need to change, then no information needs to be supplied to that pixel, and the internal local memory can retain the brightness information stored in the pixel memory. The local memory can then provide to the pixel circuit the information necessary to control the pixel brightness.

Preferably, a display communications device 100 according to the invention can be voice activated. For example, a user might want to display email or a flight schedule, to zoom into an image, or to move an image from one part of the screen to another. The user desiring to view his emails, for example, can simply command the device to show emails by speaking a command such as "show email" into the microphone. The processor 103 determines that the input audio is a voice command (rather than part of a telephone conversation). The processor 103 can include logic to receive the voice command, interpret it, and respond accordingly. For example, the processor 103 might retrieve the user's email from the user's email box, which can be stored in memory 105 in the communications device 100. Alternatively, however, the processor 103 can initiate an Internet connection to retrieve the user's email. In any event, the processor 103 causes the display 106 to display the user's email as a result of the user's voice activation command. In general, voice activation technology can be employed to cause the device 100 to perform any function that the device 100 can otherwise perform.

The display 106 can have a display border 115, as shown, that can include a microphone 121, a speaker 123, and a digital imager 125. The imager 125 can be a thin film device integrated into the display screen 110. For example, each pixel 109 (or some subset of pixels) could have a sensing element to receive light within its field of view. Alternatively, through the use of large area imaging technologies, the display screen 110 can, as a whole, be a combined video transmitted/receiver. In another embodiment of the invention, the imager 125 is separate from the display screen 110. For example, the imager 125 can be embedded into or attached onto the display border 115 or the device housing 102. In a preferred embodiment, the imager 125 is a thin film device that is thin enough and flexible enough so that the collapsible nature of the display 106 is unaffected. The imager can produce digital data corresponding to still photos or video. The digital data can be stored to memory (either to fixed memory in the housing 102 or to a removable memory card), and retrieved for later display. In this context, the device 100 can act like a digital camera or video camera.

The display 106 can include a speaker 123, if desired, so that a stereo effect can be achieved. When the display 106 is collapsed, the speaker 108 on the housing 102 provides output audio. When the display 106 is extended, however, the speaker 123 on the display 106 is automatically activated. As with the video imager, it is preferred that the speaker 123 is a thin film speaker that is thin enough and flexible enough so that the collapsible nature of the display 106 is unaffected.

Preferably, the display system 106 includes a touch responsive screen 110. In a touch responsive screen, components can be added into the screen itself, or overlaid on top of the screen 110, so that the device 100 can detect the presence and position of any touch input. For example, the user can use such a touch responsive screen, in conjunction with a stylus (or the user's finger) to write on the screen. The screen detects the touch of the stylus, and displays a contrasting color (or grayscale) where the stylus has met the screen. Additionally, the display system 106 can detect the writing and convey to the processor 103 coordinate data that corresponds to the pixels that have been "touched." The processor can then cause the coordinate data to be transmitted to a far-end communications device. The far-end device can then process the received coordinate data, and display the same writing on its screen as that displayed on the user's screen. Thus, a user of a communications device according to the invention can transmit written information from his device to a far-end device.

A touch responsive screen also enables the display system 106 to detect and process user entered touch commands. This information can be used, for example, to activate switches displayed on the screen 110, or to highlight specific points on the display 106 (for example, as a zoom reference point).

Figure 4:
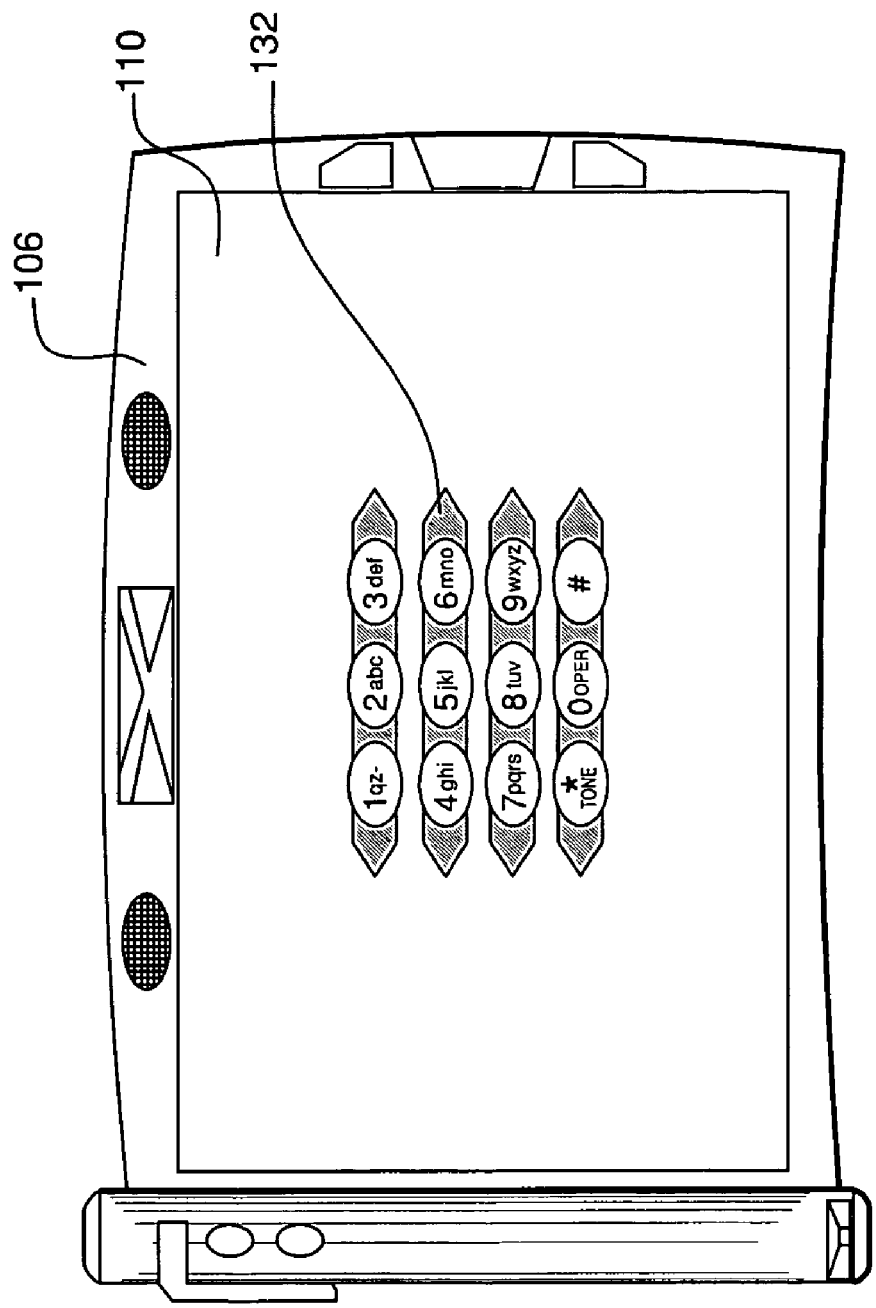
FIG. 4 depicts a preferred embodiment of a display communications system according to the invention having a touch responsive display with a telephone keypad.

FIG. 4 depicts a preferred embodiment of a display communications device 100 according to the invention having a touch responsive display 106 with a telephone keypad 132. The user can use the telephone keypad 132 on the display 106 just as one would use the telephone keypad buttons of an ordinary telephone. The display system 106 detects the user's touch, determines which portion of the screen the user has touched, and communicates to the processor 103 a representation that indicates that the user has touched that portion of the screen. For example, each pixel can be assigned a coordinate representation (in the x-y plane, for example). When the user touches the display screen, the display system detects that certain pixels have been touched, and relays the corresponding coordinates to the processor. The processor 103 processes the touch commands according to which portion(s) of the screen the user has touched. For example, if the screen is currently displaying telephone keypad buttons, the processor can be programmed to initiate a telephone call to the "touched" telephone number.

Figure 5:
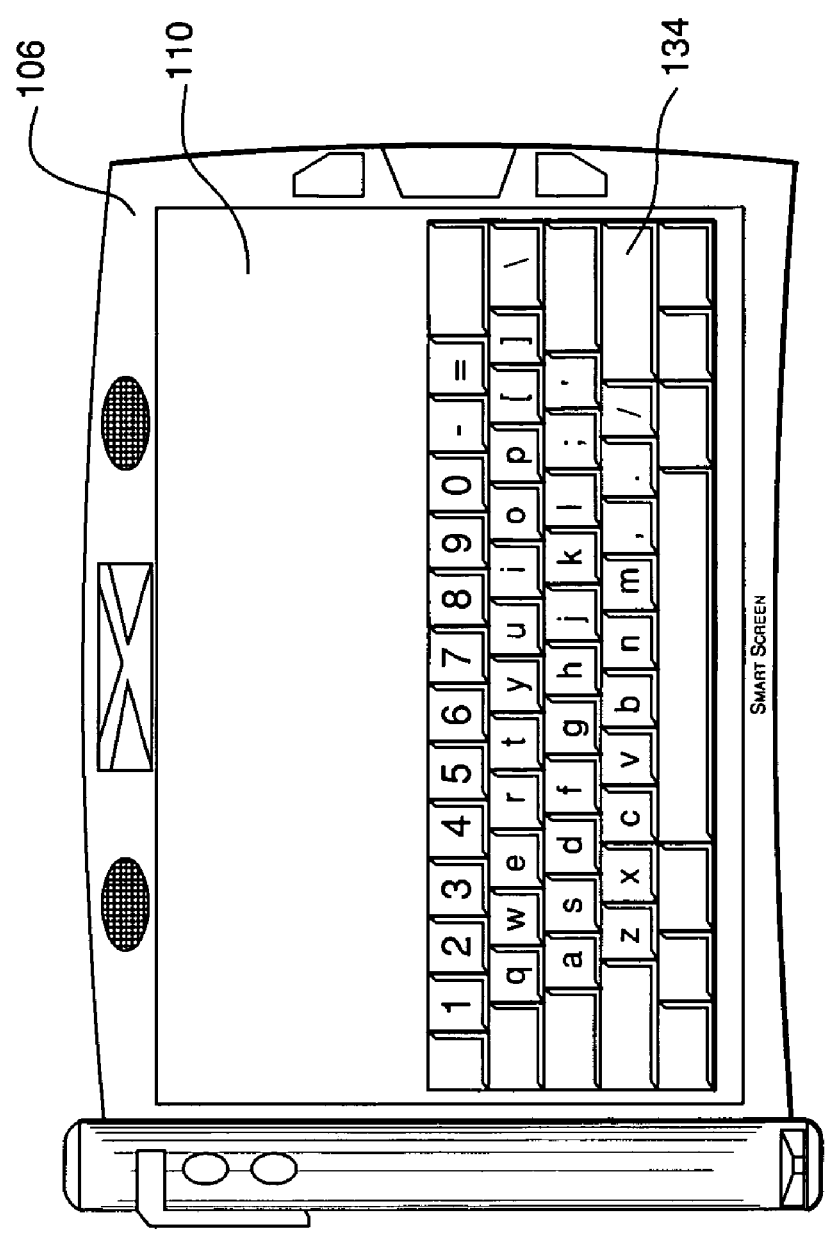
FIG. 5 depicts a preferred embodiment of a display communications system according to the invention a display having a touch responsive display with a keyboard.

Similarly, FIG. 5 depicts a preferred embodiment of a display communications device 100 according to the invention having a touch responsive display 106 with a keyboard 134, such as one might find on a personal digital assistant or pager for example. The user can use the screen 110 as a keyboard for accessing the Internet, communicating via email, paging, etc. Again, the display system 106 detects the user's touch, determines which portion of the screen the user has touched, and communicates to the processor 103 a representation that indicates that the user has touched that portion of the screen. The processor 103 processes the touch commands according to which portion(s) of the screen the user has touched.

Figure 6:
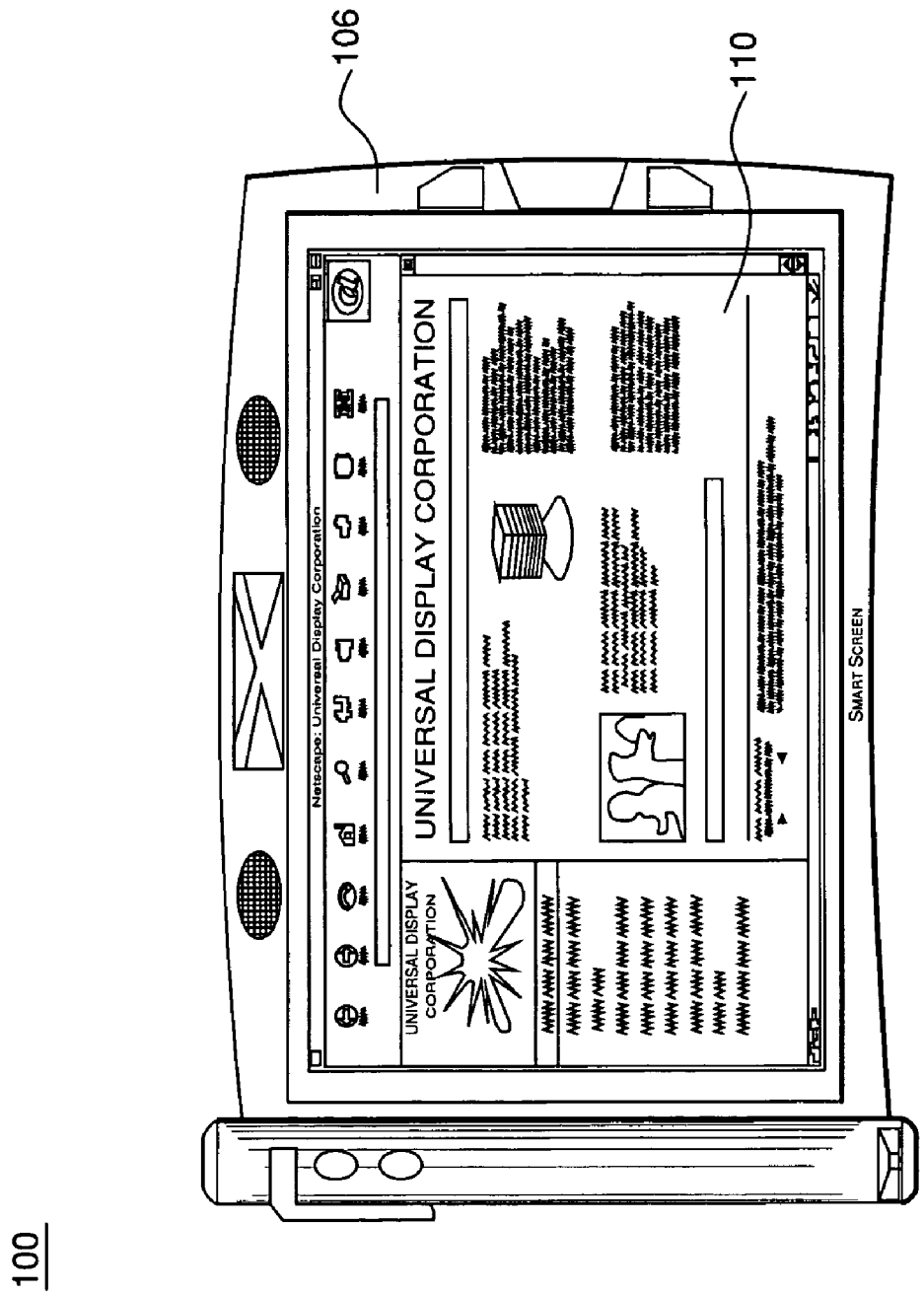
FIG. 6 depicts a preferred embodiment of a display communications system according to the invention a full color display capable of displaying an entire Web page.

FIG. 6 depicts a preferred embodiment of a display communications device 100 according to the invention having a display screen 110 that is capable of displaying an entire Web page. Preferably, the display screen 110 provides full color display and is sized and shaped to display a Web page in a visually appealing format.

Preferably, the display system 106 can display multiple images on the display screen 110. That is, the display system 106 can provide split screen displays, such as those that might be downloaded from a web site, or can provide multiple active areas at the same time. For example, the display screen 110 can include a first sub-display (or window) that displays web pages as the user downloads them from the internet, and a second sub-display (or window) that displays the user's email at the same time. The user can move from window to window to interact alternatively with the internet or his email. Thus, a display communications device 100 according to the invention can be used to perform multiple functions concurrently.

Preferably, the display system 106 is self-configurable. For example, a sub-display might be made up of a 4×4 array of bistable pixels. Bistable pixels stay in their current state until told to change. Optionally, the bistable pixels can include organic photodetectors. In one configuration, the sub-display might change grayscale by changing the number of the 16 pixels that are on (or off) at a given time. The display can reconfigure itself as a matter of grayscale versus resolution based on to the needs of the image to be displayed. That is, the sub-display can reconfigure itself, based on whether a more precise grayscale or more resolution is desired for the current display. For example, for a particular image, four gray levels might be adequate but more resolution is desirable. In such an application, the 4×4 sub-display could reconfigure itself as four 2×2 sub-displays, each having four gray levels. Similarly, four 4×4 sub-displays could work together to form an 8×8 display having less resolution, but 64 gray levels.

In one embodiment of a bistable display, each pixel operates in a binary mode, that is, each pixel is either on or off. Gray scale can be achieved by defining each pixel as a series of sub-pixels (for example, 4, 8, 16, or 64). Gray scale can then be implemented by turning on or off the appropriate number of sub-pixels. Thus, the display can be used at maximum resolution, with each pixel either on or off, or at lower resolutions, with each pixel displaying gray scale information.

It is also contemplated that a display system 106 according to the invention can be removably connected to the housing 102, as well as to any number of external devices, such as portable phones, laptop or personal computers, personal digital assistants (PDAs), internet appliances, televisions, or the like. In this context, the display system 106 can be coupled to an external device in any fashion that provides for the transfer of information, either directly or remotely, between the display system 106 and the external device. Examples of such connectivity can include, without limitation, radio, infra-red, or other such communications carriers. In such an implementation, the display system 106 can be adapted to determine an identity of the external device to which it is communicating, and to respond accordingly. For example, the user of an intelligent display system according to the invention can connect the display system 106 to a cellular phone (or other such external device). Thereafter, the display system 106 assumes the attributes of the display included with the external device, and thus can provide a better display than the display included with the external device.

In these cases the display system 106 recognizes the display characteristics of the system to which it is connecting. For example, if the display system 106 were connected to a cell phone, it could determine the resolution and gray scale content, for example, of the cell phone display. The display system 106 could then adjust the image of the cell phone display so that it could be viewed appropriately at different sizes. Each pixel of the cell phone display could be mapped onto a corresponding pixel 109 in the display system 106. Alternatively, if a larger or more resolute image is desired, each pixel from the cell phone could map onto a plurality of pixels of the display system 106.

The display communications device 100 can also include location finding capabilities, such as global positioning. For example, the antenna 104 can receive global positioning signals from one or more global positioning satellites. The processor 103 can then determine the location of the device 100 from the global positioning signals. The processor 103 can pass data to the display system 106 so that the display system 106 can provide a visual representation of the location of the device 100 based on the received global positioning signals.

Figure 7:
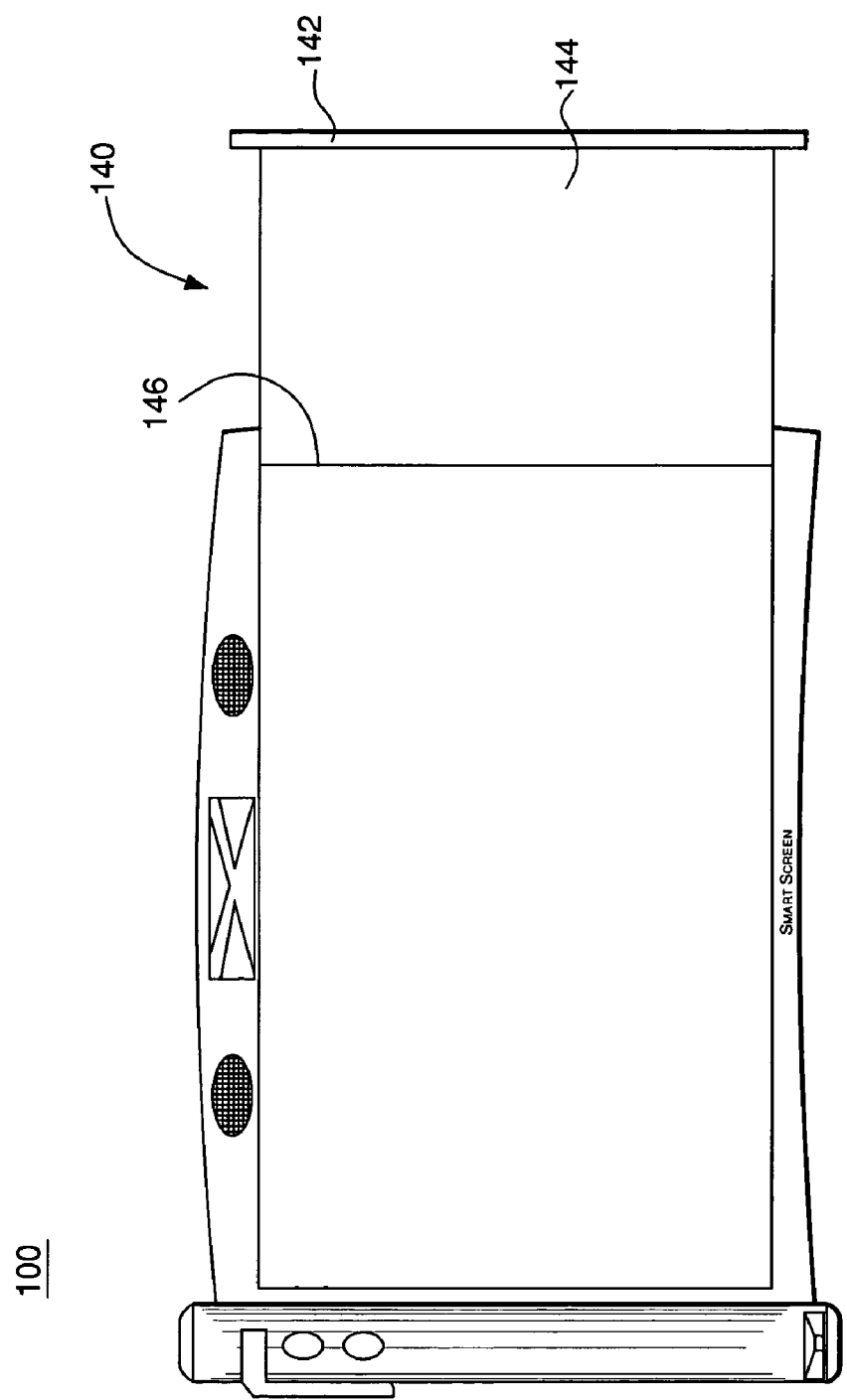
FIG. 7 depicts a preferred display communications system according to the invention having a display extension.

FIG. 7 depicts a preferred embodiment of a display communications device 100 according to the invention that includes a display system extension 140. As shown, the display extension can also be collapsible. Preferably, the display system extension 140 includes a collapsible display screen extension 144. The display screen extension 144 can be made as described above in connection with display system 106. Preferably, the display screen extension 144 can be wound around a rod (not shown) that is contained within an extension housing 142. Thus, a display communications device 100 having a display system extension 140 can take the form of a "pen and pencil" set.

The display system 106 and the display system extension 140 are coupled to one another via a display extension interface 146. When the display system extension 140 is coupled to the display system 106, the device 100 detects that the display system extension 140 is present. Thereafter, the processor 103 can provide display data for both the display system 106 and the display system extension 140. For example, a display data bus can extends through the display system 106, culminating at the display extension interface 146. Similarly, the display system extension 140 can include a display data bus that also culminates at the display extension interface. Thus, the processor can communicate display data to both the display system 106 and the display system extension 140 via a common bus. The display extension 140 can also include additional memory.

Thus, there have been described interactive, low power, collapsible, intelligent, multi-media display systems for use as hand-held, portable communications devices. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

What is claimed is:

1. A display communications device comprising:
   a housing that contains a processor;
   means, coupled to the processor, for receiving input radio signals; and
   a flexible, collapsible display, including a plurality of organic light emitting devices (OLEDs), that is mechanically coupled to the housing and electrically coupled to the processor,
   wherein the display is collapsible into the interior of the housing has a viewable surface area that is larger than any cross-sectional area taken through the housing, and wherein the processor is adapted to extract display data from the input radio signals, and to provide a representation of the display data to the display.

2. The display communications device of claim 1, further comprising means for transmitting output radio signals, and the processor is further adapted to receive commands from the display and to form the output radio signals based on the received commands.

3. The display communications device of claim 2, wherein the display is adapted to process touch commands and wherein the received commands are based on the touch commands.

4. The display communications device of claim 1, further comprising:
   a speaker that is coupled to the processor for transmitting output audio signals,
   wherein the processor is adapted to extract audio data from the input radio signals, and to provide to the speaker output audio signals that are representative of the extracted audio data.

5. The display communications device of claim 1, further comprising:
   a microphone that is coupled to the processor for receiving input audio signals;
   wherein the processor is adapted to form output radio signals based on the input audio signals.

6. The display communications device of claim 5, wherein the processor is adapted to form the output radio signals by modulating a carrier signal with a representation of the input audio signal.

7. The display communications device of claim 5, wherein the processor is adapted to determine whether the input audio signals are telephone signals or commands.

8. The display communications device of claim 7, wherein the processor is adapted to form output radio signals that initiate a connection between the communications device and a remote network device.

9. The display communications device of claim 8, wherein the processor is adapted to connect to the Internet.

10. The display communications device of claim 1, wherein the housing contains a low voltage power supply.

11. The display communications device of claim 10, wherein the power supply is a thin film power supply.

12. The display communications device of claim 1, wherein the means for receiving input radio signals is a smart antenna.

13. The display communications device of claim 1, wherein the means for receiving input radio signals includes means for receiving signals in compliance with third generation digital radio standards.

14. The display communications device of claim 1, wherein the display comprises a plurality of smart pixels.

15. A display communications, comprising:
a housing that contains a processor;
means, coupled to the processor, for receiving input radio signals; and
a collapsible display that is mechanically coupled to the housing and electrically coupled to the processor;
wherein the display is collapsible into the interior of the housing has a viewable surface area that is larger than any cross-sectional area taken through the housing, and wherein the processor is adapted to extract display data from the input radio signals, and to provide a representation of the display data to the display; and
wherein the display is a flexible display and the communications device comprises a rod that is rotationally coupled to the housing and fixedly coupled to a first end of the display such that the display can be wound around the rod.

16. The display communications device of claim 15, wherein the rod is contained within the interior of the housing.

17. The display communications device of claim 15, wherein the rod is coupled to the exterior of the housing.

18. The display communications device of claim 1, further comprising a locking mechanism for holding the display in an extended position.

19. The display communications device of claim 1, wherein the display is a foldable display and a first end of the display is coupled to the housing such that the display can be folded into the interior of the housing.

20. The display communications device of claim 1, wherein the display is touch responsive.

21. The display communications device of claim 20, wherein the display provides touch signals to the processor and the processor performs responsive operations in response to receiving the touch signals.

22. The display communications device of claim 1, further comprising display memory for storing display data that corresponds to information currently being displayed.

23. The display communications device of claim 22, wherein the display memory is embedded into the display.

24. A display communications device comprising:
a housing that contains a processor;
means, coupled to the processor, for receiving input radio signals;
a collapsible display that is mechanically coupled to the housing and electrically coupled to the processor; and
display memory for storing display data that corresponds to information currently being displayed;
wherein the display is collapsible into the interior of the housing has a viewable surface area that is larger than any cross-sectional area taken through the housing, and wherein the processor is adapted to extract display data from the input radio signals, and to provide a representation of the display data to the display: and
wherein the display memory is embedded into the pixels.

25. The display communications device of claim 22, wherein the display memory is contained in the housing.

26. The display communications device of claim 1, wherein the display is removably coupled to the housing.

27. The display communications device of claim 26, wherein the display is adapted to be removably coupled to each of a plurality of different types of external devices.

28. The display communications device of claim 27, wherein the display is adapted to automatically configure to the external device to which it is coupled.

29. The display communications device of claim 1, wherein the display data is video data.

30. The display communications device of claim 1, wherein the display includes a plurality of bistable pixels.

31. The display communications device of claim 1, wherein the processor updates the display by providing a data packet that includes a pixel address and a brightness that corresponds to a pixel located at the pixel address.

32. The display communications device of claim 1, wherein the processor is adapted to compare a current image with a previous image, to identify one or more pixels having a pixel brightness that needs to be changed to convert the display from the previous image to the current image, and to provide the display with display data that causes the pixel brightness of the one or more identified pixels to change.

33. A display communications device comprising:
a housing that contains a processor;
means, coupled to the processor, for receiving input radio signals; and
a collapsible display that is mechanically coupled to the housing and electrically coupled to the processor;
wherein the display is collapsible into the interior of the housing has a viewable surface area that is larger than any cross-sectional area taken through the housing, and wherein the processor is adapted to extract display data from the input radio signals, and to provide a representation of the display data to the display; and
wherein the processor includes a microprocessor.

34. The display communications device of claim 1, further comprising local processing power for each pixel.

35. The display communications device of claim 1, wherein the device is voice activated.

36. The display communications device of claim 35, wherein the processor is adapted to determine whether the device is in a telephone mode or a command mode and, if the device is in command mode, to respond to voice activation commands.

37. The display communications device of claim 1, wherein the display comprises a plurality of self-configurable pixels.

38. A display communications device comprising:
a housing that contains a processor;
means, coupled to the processor, for receiving input radio signals; and
a collapsible display that is mechanically coupled to the housing and electrically coupled to the processor;
wherein the display is collapsible into the interior of the housing has a viewable surface area that is larger than any cross-sectional area taken through the housing, and wherein the processor is adapted to extract display data from the input radio signals, and to provide a representation of the display data to the display;
wherein the display comprises a plurality of self-configurable pixels; and wherein each pixel includes a local processor and a memory that contains a pixel address associated with the pixel.

39. A display communications device comprising:

a housing that contains a processor;

means, coupled to the processor, for receiving input radio signals; and a collapsible display that is mechanically coupled to the housing and electrically coupled to the processor;

wherein the display is collapsible into the interior of the housing has a viewable surface area that is larger than any cross-sectional area taken through the housing, and wherein the processor is adapted to extract display data from the input radio signals, and to provide a representation of the display data to the display;

wherein the display comprises a plurality of self-configurable pixels; and wherein the pixels are adapted to configure themselves with respect to grayscale and resolution.

40. The display communications device of claim 39, wherein the pixels include groups of sub-pixels, and each sub-pixel includes a number of organic light emitting devices.

41. The display communications device of claim 40, wherein the number of organic light emitting devices that form a sub-pixel depends on grayscale and resolution of the pixel.

42. The display communications device of claim 1, wherein the display comprises a plurality of small molecule OLEDs.

43. The display communications device of claim 1, wherein the display comprises a plurality of polymer OLEDs.

44. The display communications device of claim 1, wherein the display comprises a plurality of stacked organic light emitting devices (SOLEDs).

45. The display communications device of claim 1, wherein the display comprises a plurality of transparent organic light emitting devices (TOLEDs).

46. The display communications device of claim 1, wherein the OLEDs are integrated with organic photodetectors.

47. The display communications device of claim 46, wherein the OLEDs form bistable pixels.

48. The display communications device of claim 1, further comprising a video imager.

49. The display communications device of claim 48, wherein the display comprises a display border and the video imager is integrated into the display border.

50. The display communications device of claim 48, wherein the display comprises a display screen and the video imager is integrated into the display screen.

51. A display communications device comprising:

a housing that contains a processor;

means, coupled to the processor, for receiving input radio signals; and a flexible, collapsible active matrix display, including a plurality of organic light emitting devices (OLEDs), that is mechanically coupled to the housing and electrically coupled to the processor, wherein the display is collapsible into the interior of the housing has a viewable surface area that is larger than any cross-sectional area taken through the housing, and wherein the processor is adapted to extract display data from the input radio signals, and to provide a representation of the display data to the display.

* * * * *

UNITED STATES PATENT AND TRADEMARK OFFICE
CERTIFICATE OF CORRECTION

| | |
|---|---|
| PATENT NO. | : 7,050,835 B2 |
| APPLICATION NO. | : 10/020336 |
| DATED | : May 23, 2006 |
| INVENTOR(S) | : Hack et al. |

It is certified that error appears in the above-identified patent and that said Letters Patent is hereby corrected as shown below:

At column 14, line 22, after "flexible" and before "display" delete ", collapsible".

At column 14, line 22, after "display", delete ", including a plurality of".

At column 14, line 23, delete "organic light emitting devices (OLEDs),".

At column 14, line 25, after "processor," insert --the flexible display including a flexible substrate, an active-matrix backplane arranged on the flexible substrate, and a plurality of organic light emitting devices (OLEDs) arranged on the active-matrix backplane,--.

At column 14, lines 26, change "collapsible" to --rollable--.

At column 14, line 27, after "housing" and before "has a viewable", insert --, wound more than one complete revolution upon itself, and--.

At column 15, line 53, change "A display communications device comprising:" to --The display communications device of claim 22, --.

At column 15, delete lines 54 to 66 in their entirety.

At column 16, line 27, change "A display communications device comprising." to --The display communications device of claim 1,--.

At column 16, delete lines 28 to 39 in their entirety.

At column 16, line 53, change "A display communications device comprising:" to --The display communications device of claim 37, --.

At column 16, delete lines 54 to 67 in their entirety.

At column 17, line 4, change "A display communications device comprising:" to --The display communications device of claim 37, --.

At column 17, delete lines 5 to 17 in their entirety.

At column 18, line 24, after "flexible", change ", collapsible active matrix display, including a" to --display--.

UNITED STATES PATENT AND TRADEMARK OFFICE
CERTIFICATE OF CORRECTION

PATENT NO. : 7,050,835 B2
APPLICATION NO. : 10/020336
DATED : May 23, 2006
INVENTOR(S) : Hack et al.

It is certified that error appears in the above-identified patent and that said Letters Patent is hereby corrected as shown below:

At column 18, delete line 25 in its entirety.

At column 18, line 28, change "collapsible" to --rollable--.

At column 18, line 29, after "housing" and before "has a viewable", insert --, wound more than one complete revolution upon itself, and--.

Signed and Sealed this

Nineteenth Day of June, 2007

JON W. DUDAS
*Director of the United States Patent and Trademark Office*